Patented Dec. 9, 1941

2,265,143

UNITED STATES PATENT OFFICE 2,265,143

COMPOUNDS OF THE CYCLOPENTANO-POLYHYDRO-PHENANTHRENE SERIES AND A PROCESS OF MAKING THE SAME

Adolf Butenandt, Berlin-Dahlem, and Josef Schmidt - Thomé, Berlin - Zehlendorf, Germany, assignors to Schering Corporation, Bloomfield, N. J., a corporation of New Jersey No Drawing. Application May 27, 1939, Serial No. 276,076. In Germany May 31, 1938

24 Claims. (Cl. 260—348)

This invention relates to compounds of the cyclopentano-polyhydro-phenanthrene series and a process of making the same, and is an improvement over the process and product of copending application Serial No. 153,002, filed July 10, 1937.

In application Serial No. 153,002 there is described and claimed a process for the manufacture of polyhydric alcohols of the aetiocholane series in which quite generally alkenyl-like compounds of this series are either converted by the action of a compound suitable for the addition of two OH-groups to a carbon-carbon double bond, such as hydrogen peroxide, osmium tetroxide and the like, directly into the corresponding glycol-like compounds or first transformed by the action of agents adding on oxygen for example per-benzoic acid or per-phthalic acid into the corresponding oxides and these subsequently converted by means of agents of hydrolysing action into the corresponding glycols.

Methods of this kind are described for example, in Houben-Weyl, Methoden der organischen Chemie, vol. 3, 3rd edition, page 214 et seq., Windaus, Berichte der Deutschen Chemischen Gesellschaft, vol. 48, pages 1064 et seq. (1915), Criegee, Annalen der Chemie, vol. 522, pages 75 et seq. (1936).

In accordance with the present invention it is also possible to obtain valuable polyhydric alcohols of the cyclopentano polyhydrophenanthrene series when as starting materials for carrying out the process of copending application Serial No. 153,002 compounds of this series having a specific composition are employed, namely those in which a double bond is present between a ring carbon atom and the neighbouring carbon atom of the side chain.

The unsaturated compounds of the etio-cholane and pregnane series serving as starting materials can be of any suitable origin and can contain one or several double bonds in the ring system. Furthermore they can contain, particularly on the carbon atom 3 a functional group, for example, a hydroxyl group or a keto group. Instead of the hydroxyl group, there may be present a group that can be converted into the hydroxyl-group, for instance the ester, ether group, halogen or the like. The keto group can also be present in substituted form, for instance, in form as an enolic derivative and the like. The double bond in the ring system can also be in any suitable position, for example, between the carbon atoms 4 and 5 or 5 and 6.

It may be further emphasized that under compounds of the etio-cholane series are intended to be understood not only the nuclearly saturated and unsaturated compounds of the actual etio-cholane series but also those of the so-called etio-allo-cholane series.

The following formulae selected by way of example will serve to explain the inventive idea:

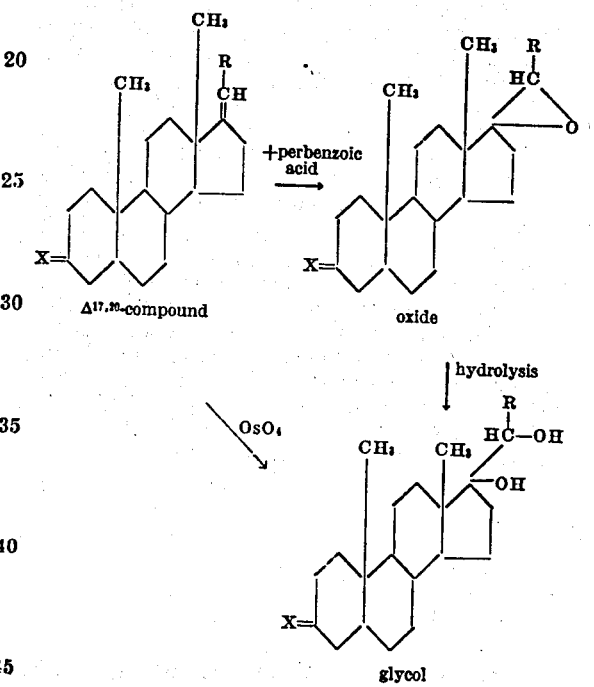

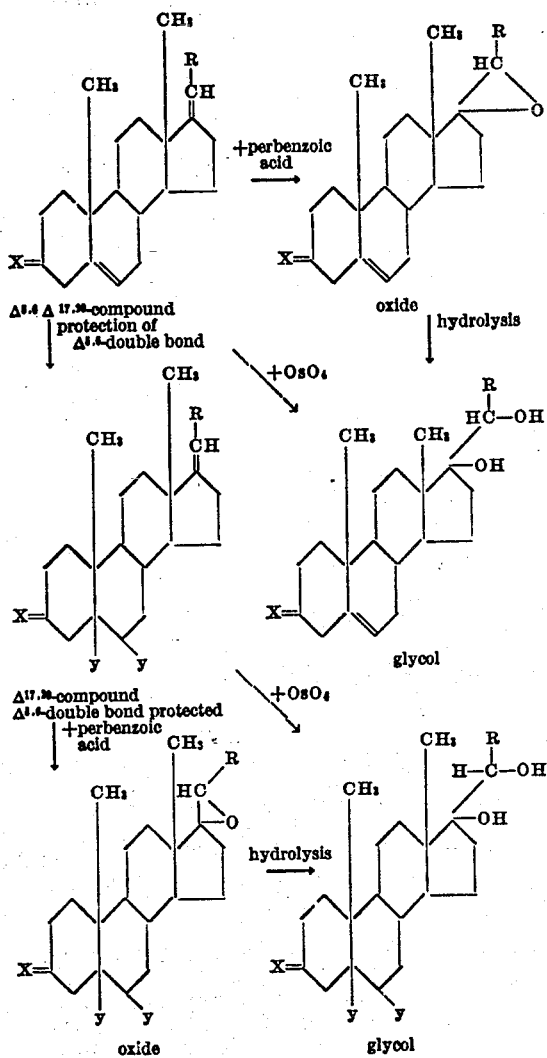

In these formulae,

X=hydrogen and a hydroxy group or a group convertible thereinto, as, for instance an ester, ether group, halogen and the like, or an oxo group or a group convertible thereinto, as, for instance, an enolic, enolic ester, -ether group and the like.

Y=halogen or YY=halogen hydride.

R=hydrogen or a hydrocarbon radical which may be substituted by a hydroxyl group or an oxo group or a carboxyl group or group convertible thereinto, as with the aid of hydrolysis.

Of particular interest in this connection are compounds with a double bond between the carbon atoms 17 and 20. Such compounds can for example be obtained by splitting off water from the reaction products of ketones of the cyclopentano-polyhydrophenanthrene series with metalorganic compounds according to the process of copending application Serial No. 117,152, filed Dec. 22, 1936, and Serial No. 213,630, filed June 14, 1938. They possess the general formula:

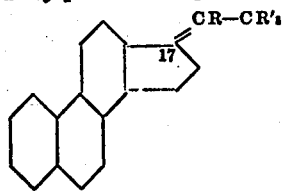

in which for the sake of clearness only the atoms or groups of atoms present on the carbon atom 17 are represented, R and R' indicating either hydrogen and or any hydrocarbon residue.

Such compounds, saturated or unsaturated in the ring system, are now subjected to the process described in the above-mentioned application Ser. No. 153,002, in which case it may be recommended intermediately to protect any double bond present in the ring system in the customary manner for example by adding on halogen, halogen hydride and the like.

There are thus obtained compounds of the constitution

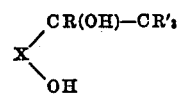

in which X is a cyclopentano-polyhydrophenanthrene ring system which may be substituted in any way and R and R' indicate the above specified substituents.

In the case of $\Delta^{4,5},\Delta^{17,20}$-pregnadien-one-(3) there is thus obtained $\Delta^{4,5}$-pregnenone-(3)-diol-(17.20), from which by water-splitting, for example by heating if desired in high vacuum or by addition of water-splitting agents as for example anhydrous copper sulphate or by both methods the splitting off of 1 molecule of water can be effected, whereby pregnendione-3.20 is obtained.

Obviously also in corresponding manner from other alcohols of the cyclopentano-polyhydrophenanthrene series produced in the described manner water can be split off in which case the tertiary hydroxyl group is split off on account of its greater mobility.

The splitting off of water from the glycol-like compounds obtained according to this invention may be illustrated by way of example by the following formulae:

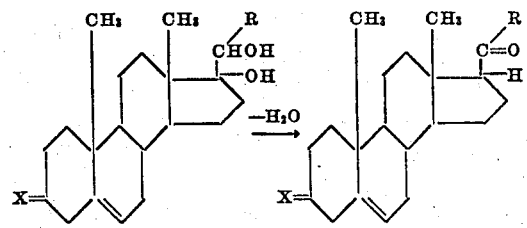

wherein R and X have the same meaning as described above. The process of splitting off water is carried out, for instance, according to the process described in copending application Serial No. 213,630, filed June 14, 1938, namely by increase of temperature, for example heating in vacuum, or by addition of agents splitting off water as for example dehydrated copper sulfate, mineral acids, formic acid and the like or by both methods. Such methods are described, for instance, in Houben-Weyl, Methoden der organischen Chemie 3rd edition, vol. 3, pages 165 et seq. (1923). By this means the glycolic compound used as starting material is converted into corresponding ketonic compound.

The following examples illustrate the invention without, however, limiting the same to them.

*Example 1*

50 mgs. of $\Delta^{4,5}.\Delta^{17,20}$-pregnadien-one-(3) (M. P. 135° C.) are dissolved in 3 ccs. of absolute ether and treated with 4.6 ccs. of a 1% solution of osmium tetroxide in absolute ether. The reaction mixture is kept for 2 days in an ice chest and freed from solvent in vacuum. The dry residue is heated on the water bath for 2 hours with a solution of 1 gram of sodium sulphite in 10 ccs. of water and 5 ccs. of ethanol; the precipitated black deposit is filtered and again boiled with alcohol. The combined filtrates are then extracted with chloroform and the portions soluble in chloroform after evaporation of the solvent caused to crystallise from acetone and recrystallised from chloroform ethyl acetate.

The $\Delta^{4.5}$-pregnenone-(3)-diol-(17.20) crystallises in rhombs of M. P. 199° C. The yield amounts to 70%.

This product is heated for two hours under reflux in dioxane solution in the presence of sulphuric acid. Thereafter the reaction mixture is taken up in a large quantity of ether and the ether is washed with water and bicarbonate solution. After evaporating the ether the residue is subjected to fractional distillation in a high vacuum and yields $\Delta^{4.5}$-pregnendione-3,17.

Example 2

100 mgs. of the product obtained from allyltestosterone by splitting off the elements of water are dissolved in 12 ccs. of absolute ether and treated with 18.2 ccs. (corresponding to 2.2 mol) of an absolute etherealosmium tetroxide solution (1 gram of $OsO_4$ in 100 ccs. of absolute ether). After 80 hours' standing at about 20° C. the ether is evaporated in vacuum and the residue boiled with a solution of 2 grams of sodium sulphite in 20 ccs. of water and 10 ccs. of alcohol for 3 hours. The precipitate produced is after filtration boiled several times with alcohol; the alcoholic filtrates are concentrated in vacuum, combined with the original filtrate and the mixture repeatedly extracted with chloroform. The dry residue of the chloroform solution is taken up in alcohol from which after boiling with animal charcoal the tetrol is obtained in a yield of 13.5% in prismatic crystal needles of M. P. 237.5° C. The substance is difficultly soluble in chloroform, ethyl acetate, methanol, acetone and alcohol and also in cold water; in hot water it is soluble.

By splitting off water from this tetrol by means of heating in a vacuum in the presence of copper sulphate a compound is obtained that shows an activity corresponding to that of the suprarenal cortical hormone.

Example 3

1.6 grams of diacetate of 17-ethenyl-androstandiol-3.21-($\Delta^{17.20}$-allopregnen-diol-3.21) are dissolved in 60 ccs. of ether and treated with 1.13 grams of osmium tetroxide. After 3 days the whole is evaporated in vacuum and the residue boiled twice for 1½ hours with 10 grams of sodium sulphite in 70 ccs. of water and 20 ccs. of alcohol. The filtrates filtered from sodium osmium sulphite are evaporated in vacuum and the residue after addition of methanol extracted with ether.

The ether-methanol extracts are evaporated and the residue obtained recrystallised from acetone. The β-allo-pregnantetrol thus obtained exhibits a melting point of 200° C. The specific rotation amounts to $[\alpha]^{D}_{20}=0°\pm 2°$ in absolute alcohol.

0.8 gram of β-allo-pregnantetrol is dissolved in 15 ccs. of pyridine and allowed to stand in the cold for 2 days with 5 ccs. of acetic anhydride. The whole is evaporated in high vacuum and the solid residue recrystallised from acetone. The melting point of the tri-acetate thus obtained amounts to 167° C., its specific rotation $[\alpha]^{D}_{20}=53.9°$ in acetone.

By splitting off water from β-allo-pregnantetrol as described in Example 1 there is obtained a compound that after oxidation of the 3-hydroxy group exhibits the physiological activity of a suprarenal cortical hormone.

Example 4

4.3 gs. of $\Delta^{17,20}$-ethenyl-$\Delta^{5,6}$-androstenol-3-acetate are dissolved in 80 ccs. of absolute ether and treated with 3.5 gs. of osmium tetroxide in 20 ccs. of ether. The reaction mixture becomes dark-brown very rapidly. It is allowed to stand for 3 days at 20° C. Thereupon the ether is distilled off in a vacuum, the residue is dissolved in 150 ccs. of alcohol and is boiled for 1½ hours with a solution of 22 gs. of sodium sulphite in 100 ccs. of water in order to split the osmium acid ester. The precipitated osmium and sodium sulphite are filtered off and extracted several times with alcohol, the combined filtrates are then poured into water. The precipitated reaction product is filtered off and dried. Thus 4 gs. of a crude product having a melting point of 200–220° C. are obtained. This product seems to be a mixture of two stereo isomeric trioles (the acetate group in 3-position being saponified by sodium sulphite). By repeated recrystallisation one of the two isomeric $\Delta_5$-pregnentriol-3,17,20 of the melting point 227° C. is obtained. It crystallizes from chloroform in long needles, from acetic acid ester in prisms and from alcohol in small leaflets optical rotation: $[\alpha]^{20}_D=-75°$.

For isolating the other pregnentriols 4 gs. of the crude triol product of the melting point of 200–220° are allowed to stand for one night at 20° C. in a mixture of 15 ccs. of pyridine and 15 ccs. of acetic acid anhydride. After pouring into water the precipitate is filtered off. Small needles crystallize from aqueous acetone having a melting point of 180° C. (1.1 g.) which can be purified by repeated recrystallization from aqueous alcohol and $\Delta^{5,6}$-pregnentriol-3,17,20-diacetate-3,20 having a melting point of 182° C. and an optical rotation of $[\alpha]^{20}_D=-74°$.

From the mother liquor long needles crystallize having a melting point of 148° C. (2,2 gs.) the melting point of which can be raised up to 152–153° C. after repeated recrystallization from aqueous alcohol. This diacetate represents a $\Delta^{5,6}$-pregnentriol-3,17,20-diacetate-3,20 with the optical rotation of $[\alpha]^{20}_D=-36°$ being stereo isomeric to the above mentioned $\Delta^{5,6}$ pregnentriol-3,17,20-diacetate-3,20.

Of course, many changes and variations may be made in the reaction conditions by those skilled in the art in accordance with the principles set forth herein and in the claims annexed hereto.

What we claim is:

1. A process of making polyhydric alcohols of the cyclopentano-polyhydro phenanthrene series, comprising reacting compounds of the cyclopentano-polyhydro phenanthrene series in which a double bond is present as the linkage between a nuclear carbon atom and a side chain carbon atom with an agent capable of adding on oxygen at the double bond.

2. A process of making polyhydric alcohols of the cyclopentano-polyhydro phenanthrene series, comprising reacting compounds of the cyclopentano-polyhydro phenanthrene series in which a double bond is present as the linkage between a nuclear carbon atom and a side chain carbon atom with an agent capable of adding on oxygen at the double bond, and subjecting the reaction product to the action of a hydrolysing agent.

3. A process of making polyhydric alcohols of the cyclopentano-polyhydro phenanthrene series, comprising reacting compounds of the cyclophentano-polyhydro phenanthrene series in which a double bond is present as the linkage between a nuclear carbon atom and a side chain carbon atom with an agent capable of adding on oxygen at the double bond and leading to the formation of oxides.

4. A process of making polyhydric alcohols of the cyclopentano-polyhydro phenanthrene series, comprising reacting compounds of the cyclopentano-polyhydro phenanthrene series in which a double bond is present as the linkage between a nuclear carbon atom and a side chain carbon atom with an agent capable of adding on oxygen at the double bond and leading to the formation of compounds having a glycol grouping.

5. A process of making polyhydric alcohols of the cyclopentano-polyhydro phenanthrene series, comprising reacting compounds of the cyclopentano-polyhydro phenanthrene series in which a double bond is present as the linkage between a nuclear carbon atom and a side chain carbon atom with an agent capable of adding on oxygen at the double bond and leading to the formation of oxides and subjecting the reaction product to the action of a hydrolysing agent.

6. Process as claimed in claim 1, in which the starting materials contain at the carbon atom 3 a member of the group consisting of oxygen, hydroxyl and groups convertible thereinto with the aid of hydrolysis.

7. Process as claimed in claim 2, in which the starting materials contain at the carbon atom 3 a member of the group consisting of oxygen, hydroxyl and groups convertible thereinto with the aid of hydrolysis.

8. Process as claimed in claim 1, in which as starting material there is used an androstan compound of the following structural formula

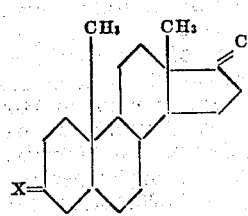

wherein the cyclopentano-polyhydro phenanthrene-nucleus contains a further double bond and wherein X represents a functional member selected from the group consisting of a hydroxy group, an oxo group and a group convertible thereinto with the aid of hydrolysis, while R indicates a member of the group consisting of hydrogen, a hydrocarbon radical, and hydrocarbon radicals substituted by a member of the class consisting of a hydroxy, an oxo, a carboxy group, and a group convertible thereinto with the aid of hydrolysis.

9. Process as claimed in claim 2, in which as starting material there is used an androstan compound of the following structural formula

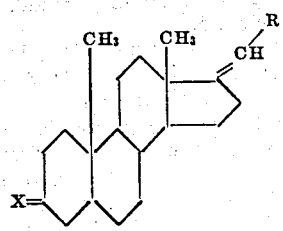

wherein the cyclopentano-polyhydro phenanthrene-nucleus contains a further double bond and wherein X represents a functional member selected from the group consisting of a hydroxy group, an oxo group and a group convertible thereinto with the aid of hydrolysis, while R indicates a member of the group consisting of hydrogen, a hydrocarbon radical, and hydrocarbon radicals substituted by a member of the class consisting of a hydroxy, an oxo, a carboxy group, and a group convertible thereinto with the aid of hydrolysis.

10. Process as claimed in claim 3, wherein as starting material $\Delta^{4.5};\Delta^{17.20}$-pregnadienone-3 is employed.

11. Process as claimed in claim 4, wherein as starting material $\Delta^{4.5};\Delta^{17.20}$-pregnadienone-3 is employed.

12. Process as claimed in claim 5, wherein as starting material $\Delta^{4.5};\Delta^{17.20}$-pregnadienone-3 is employed.

13. Process as claimed in claim 1, wherein the attachment of oxygen is carried out with the aid of a member of the group consisting of per-benzoic acid, per-phthalic acid, per-acetic acid, hydrogen peroxide and osmium tetroxide.

14. Process as claimed in claim 4, wherein the attachment of two hydroxy groups to the carbon-carbon double bond is effected by means of osmium tetroxide.

15. The oxygenated product of the reaction of a compound of the nuclearly unsaturated cyclopentano-polyhydro phenanthrene series containing a double bond in linkage between a nuclear carbon atom and a side chain carbon atom, with a compound capable of adding on oxygen at the double bond.

16. A glycollic compound of the 10,13-dimethyl cyclopentano-polyhydrophenanthrene series containing the group

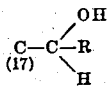

and a hydroxy group at the carbon atom 17, wherein R represents a member of the group consisting of hydrogen and hydrocarbon radicals substituted by a member of the class consisting of hydroxy, oxo, and carboxy groups, and groups convertible thereinto with the aid of hydrolysis.

17. An oxide of the cyclopentano-polyhydro phenanthrene series corresponding to the following structural formula:

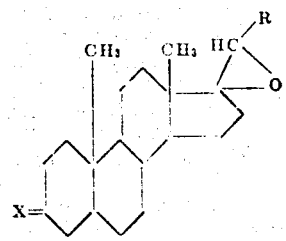

wherein the cyclopentano-polyhydro phenanthrene nucleus contains a further double bond and wherein X represents a functional member selected from the group consisting of a hydroxy group, an oxo group and a group convertible thereinto with the aid of hydrolysis, while R indicates a member of the group consisting of hydrogen, a hydrocarbon radical, and hydrocarbon radicals substituted by a member of the class consisting of a hydroxy, an oxo, a carboxy group, and a group convertible thereinto with the aid of hydrolysis.

18. $\Delta^{4,5}$-pregnenone-3-diol-17,20 of the structural formula

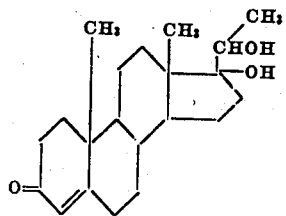

having a melting point of 199° C.

19. Process as claimed in claim 5 wherein the oxygenated glycollic reaction product is subjected to a water-splitting process.

20. Process as claimed in claim 5, wherein water is split off from the oxygenated glycollic reaction product by heating in a high vacuum in the presence of anhydrous copper sulfate.

21. An oxygenated compound of the 10,13-dimethyl cyclopentano-polyhydro-phenanthene series containing at position-17 a member of the group consisting of

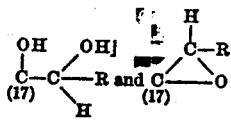

wherein R represents a member of the group consisting of hydrogen and a hydrocarbon radical which in turn is substituted by a member of the class consisting of hydroxy, oxo, and carboxy groups and groups convertible thereinto with the aid of hydrolysis.

22. A nuclearly unsaturated oxygenated compound of the 10,13-dimethyl cyclopentano-polyhydro-phenanthrene series containing at position-17 a member of the group consisting of

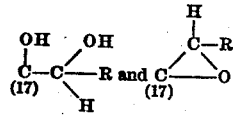

wherein R represents a member of the group consisting of hydrogen, a hydrocarbon radical, and hydrocarbon radicals substituted by a member of the class consisting of hydroxy, oxo, and carboxy groups and groups convertible thereinto.

23. β-allo-pregnane-tetrol-3,17,20,21.

24. Process as claimed in claim 3, in which the starting material contains at the carbon atom-3 a member of the group consisting of oxygen, hydroxyl, and groups convertible thereinto with the aid of hydrolysis.

ADOLF BUTENANDT.
JOSEF SCHMIDT-THOMÉ.